Patented Sept. 12, 1950

2,521,849

UNITED STATES PATENT OFFICE 2,521,849

PREPARATION OF MEAT PRODUCTS

Ervin W. Hopkins, Hinsdale, and Lucian J. Jendryaszek and Harold M. Coleman, Chicago, Ill., assignors to Armour and Company, Chicago, Ill., a corporation of Illinois No Drawing. Application October 10, 1947, Serial No. 779,224

11 Claims. (Cl. 99—194)

This invention relates to the preparation of meat products. The invention is particularly useful in the treating of comminuted meat for retaining the bright red color thereof, while at the same time causing the meat fragments to cohere during the later cooking stage.

A serious disadvantage in the marketing of many meats, particularly comminuted meats, such as hamburgers, is the purplish-red color in the interior of the meat mass, which is less acceptable to the consumer than meat which possesses a bright red color throughout. Hamburger is bright red in color when initially ground, but, after a period of time, develops the characteristic purplish color in its interior. Frequently, there appears a brown ring of color just beneath the exterior surface.

We have heretofore employed a process in which oxygen has been introduced in minute amounts at points dispersed through a ground meat mass so as to maintain in the meat mass the desired bright red color. More specifically, we have employed a process in which meat was ground while in unfrozen condition, then quickly frozen, crushed into short strands and pressed to bind the same together. The product, thus formed, retains its bright red color, but has the disadvantage that, during the cooking stage, the meat particles tend to break apart and the meat body loses its shape. In the forming of hamburger patties, etc., it is important that the meat body retains its shape during the final cooking operation.

An object of the present invention is to utilize the above described process for retaining the bright red color of ground meat, while at the same time causing the meat body to retain its shape during the cooking operation. A still further object is to provide a ground-meat patty, or other predetermined body, which will retain its desired bright red color, while at the same time being highly coherent and resisting separation during the cooking stage. A further object is to provide a process for the preparation of meat patties, and other bodies, in which simple steps result in the modification of the meat particles so as to render them highly coherent and resistant to breaking stress when the same are being handled in the frying or other cooking stage. Other specific objects and advantages will appear as the specification proceeds.

Our preferred practice involves, first, grinding the meat, freezing the ground meat, breaking the frozen mass into many small pieces, applying an edible protein denaturing-agent to the surface of the frozen meat particles, and then pressing the pieces together with pressure sufficient to bind them but not strong enough to close the inner interstices. For example, beef, pork, lamb, veal, and the like, may be ground in the usual way at room temperature and the ground meat passed into a cold zone where it is frozen solid. The frozen mass may then be broken up, by means of a hammer mill, into small pieces such as would pass through a plate having one-half inch holes. These particles are then put into a press or mold, which may suitably be the size desired for a hamburger patty, or some other desired meat body, and pressure applied. The pressure should be sufficient to unite the particles but should not be great enough to drive out all the air spaces between the particles. If the pressure is too great, substantially all of the air will be driven from the meat and most of the advantages of the process will be voided.

The pressure employed will vary in accordance with the temperature and, to a certain degree, with the kind of meat. For example, if the meat has a temperature of 0° F., more pressure is employed and more pressure can be tolerated than when the meat is at a temperature of 20° F. In the case of beef hamburger at 20° F., we find that pressures above 6,000 pounds per square inch give less color advantage, and at pressures of 10,000 pounds per square inch or more, the color advantage is greatly diminished. Pressures of the order of 4,000–6,000 pounds per square inch are usually satisfactory and it is not necessary to use more pressure than is required to unite the pieces. The meat, when pressed, may be at any temperature at which it is solidly frozen. Temperatures from 30° F. downward have been found satisfactory, but we prefer to operate at temperatures from 20–25° F.

The frozen meat may be broken up in pieces of any desired size, but if the pieces are large and compact, the full color benefit may not be obtained because of incomplete oxygenation of the meat pigments within. For this reason, it is desirable that the pieces be not larger than those which will pass through a sieve with ¾-inch openings.

While it is desirable to grind the meat before freezing, this is not essential if the frozen meat is mechanically broken up into small pieces. Due to the hardness of frozen meat, the breaking up operation is less difficult if the meat is ground before freezing. The grinding or breaking up operations may be substituted by any means of comminuting the meat material, as by cutting, dicing, cubing, or other means of comminuting the meat.

It is also possible to omit the step of breaking up the frozen meat material prior to pressing. When this is done, we prefer spreading the ground meat in loosely associated condition in a thin layer and freezing the meat in this condition. This may be arranged by discharging the meat from the grinder on a conveyor belt which passes through a low temperature zone to freeze the meat. From the conveyor the frozen meat is discharged into a forming machine adapted to deliver suitable pressures for uniting the meat into patties, loaves, or other desired shapes ready for packaging.

Even in the operation where a machine is employed for breaking up the frozen meat, it is preferable to discharge the meat from the grinder or other comminutor on a conveyor which carries it in dispersed or non-compacted form into the freezing zone, since this accelerates freezing and makes the operation continuous.

Incorporation of oxygen cannot be accomplished by mere mechanical mixing of ground meat, however violent the mixing may be, since this leaves no interstices for retaining any oxygen gas, and the mixing step tends to drive the oxygen out of the mass.

Another process wherein oxygen is introduced into the meat, involves the addition of hollow or porous edible particles. Such materials must have the ability to retain oxygen or air and make the oxygen available at the surface of the particles. For example, spray dried whole milk, skim milk, whey, egg white, or other protein materials, which are in the form of fine globules hollow on their interior, may be mixed into the meat and the oxygen then penetrates the walls of the globules and then comes into contact with and exerts its color effect on the meat interior. With such fine particles dispersed throughout the meat mass, oxygen is made available for counteracting the effect of reducing systems and a bright red color is maintained. Spongy material, such as starch in fine spongy form or dried protein foams, may be used. Such materials may be cut or ground into fine pieces of powder and mixed into the meat. Similarly, carriers of air bubbles, such as whipped gelatin or fats, may be mixed mechanically with ground meat.

Unless the meat is treated to introduce oxygen as by mixing in the oxygen-containing materials, such as spongy or globular particles, or by pressing frozen meat particles together leaving oxygen-containing interstices the meat when ground and left in a pile assumes a compact form by reason of the weight of its upper portion, and reduction of the oxygen-bearing pigments sets in, resulting in the characteristic disagreeable color in the interior.

With oxygen made available throughout the meat mass, through procedures such as those just described, a product results which retains a brighter red color throughout than meat prepared by procedures hitherto employed.

The application of the protein denaturing-agent to the surface of the ground material prior to the compression step, results in a binding of the meat particles so that the entire patty body remains intact and coherent during the frying process. Any suitable protein denaturing-agent, which is edible, may be employed. Examples are arginine hydrochloride and sodium chloride. Other denaturing-agents, which are effective in producing a coherence of the meat particles but which are not desirable from the edible standpoint are guanidine hydrochloride, formamide, urea and acetamide. Arginine hydrochloride is unusually effective in bringing about the coherence of the meat particles while also adding a protein constituent to the final product. Further, sodium chloride, in addition to bringing about the binding of the meat particles, is highly desired because it forms a desired final ingredient for the product which is to be cooked.

Following are specific examples of the practice of our invention:

Example 1

Fresh beef was ground through a plate with 1/8 inch holes, frozen, separated into particles by crushing and tempered at 23° F. Arginine hydrochloride, in the proportions of about 4 grams per pound of meat, was dusted over the meat and the patties were formed by compression. The resultant patties were fried and the particles were found to adhere tightly in a coherent body, there being no tendency for the patties to break up during the cooking step. The patties could be handled roughly and still remained intact during the cooking operation.

Example 2

Fresh beef was ground through a plate with 1/8 inch holes. The ground meat was spread thinly on trays, frozen, separated into particles by crushing, and tempered at 23° F. Sodium chloride was dusted over the meat at the rate of 4 grams per pound of meat, and the meat was then compressed in a mold at about 6000 pounds pressure to form patties. The patties were fried and found resistant to breaking up during the frying step.

Example 3

Hydrolysates of arginine-rich proteins are found to be good substitutes for arginine hydrochloride and to be cheap sources of good binding activity. Two arginine-containing proteins, gelatin and the water-soluble solids from the lard-rendering process, were acid-hydrolyzed under conditions leading to maximum arginine liberation and the mixed amino acid residues dusted on frozen meat particles in the manner described in connection with the preceding examples. Hamburger patties, thus treated, possessed excellent bind.

A mixture of 1 part of gelatin and 3 parts of 10% sulfuric acid was autoclaved at an approximate temperature of 130° C. for 5 hours. One-half volume water was added, after which barium carbonate and dilute sulfuric acid were so added such that negative tests for both $Ba^{++}$ and $SO_4^{=}$ in a centrifugate are obtained. About 5% by volume of Celite No. 545 was added, the mixture filtered, Norite added to the filtrate, and the solution separated by filtration. The solution was vacuum dried at 135° F. and the pulverized solid residue dusted on frozen meat particles in the manner and amounts identical to that described for arginine hydrochloride and salt in the prior cited Examples 1 and 2. Hamburger patties, so treated, exhibited bind comparable to that given by arginine hydrochloride or salt.

The hydrolysis product from the water-soluble solids of the lard-rendering process behaves in a manner analogous to that of the gelatin hydrolysate.

In all of the examples above, the patties retained their bright red color after standing for a considerable time. Further, in the cooking or frying step, the patties remained highly coherent, and even though pressed with a fork or spatula, remained coherent.

While in the foregoing specification, we have set forth certain steps of the process in considerable detail for the purpose of illustrating embodiments of the invention, it will be understood that such details are for the purpose of illustrating the invention and may be varied widely by those skilled in the art without departing from the spirit of our invention.

We claim:

1. In a process for preparing a coherent comminuted meat product, having improved interior color, the steps of applying to the surface of meat particles in a ground-meat mass an edible protein denaturing agent, freezing the meat particles, and pressing together the frozen meat particles to form a meat mass, which includes interstices containing oxygen.

2. In a process for preparing a coherent ground-meat product, having improved interior color, the steps of comminuting meat while in unfrozen condition, freezing the comminuted meat to a solid state, breaking the frozen meat into loosely associated particles, applying to the surface of the meat particles an edible protein denaturing agent, and pressing the meat, while thus solidly frozen, to bind the same together, using pressure insufficient to destroy interstices containing oxygen.

3. In a process for preparing a coherent ground-meat product, having improved interior color, the steps of applying to the surface of meat particles in a frozen ground-meat mass an edible protein denaturing agent, and then pressing together the frozen meat particles and denaturing agent to form a meat mass which includes interstices containing oxygen, and which mass is coherent during the cooking of the meat.

4. A process as set forth in claim 1, in which the denaturing agent is sodium chloride.

5. A process as set forth in claim 1, in which the denaturing agent is arginine hydrochloride.

6. In a process for preparing a coherent ground-meat product, having improved interior color, the steps of comminuting beef while in unfrozen condition, freezing the comminuted meat to a solid state, breaking the frozen meat into loosely associated particles, incorporating sodium chloride with the ground meat, and pressing the meat, while thus solidly frozen, to bind the same together in a predetermined form.

7. In a process for preparing a coherent ground-meat product, having improved interior color, the steps of comminuting beef while in unfrozen condition, freezing the comminuted meat to a solid state, breaking the frozen meat into loosely associated particles, incorporating arginine hydrochloride with the ground meat, and pressing the meat, while thus solidly frozen, to bind the same together in a predetermined form.

8. In a process for preparing a coherent ground-meat product, having improved interior color, the steps of comminuting meat while in unfrozen condition, freezing the comminuted meat to a solid state, breaking the frozen meat into loosely associated particles, dusting arginine hydrochloride upon the particles of the ground meat and pressing the meat, while thus solidly frozen, to bind the same together in a predetermined form.

9. In a process for preparing a coherent ground-meat product, having improved interior color, the steps of comminuting meat while in unfrozen condition, freezing the comminuted meat to a solid state, breaking the frozen meat into loosely associated particles, applying to the surface of the meat particles a hydrolysate of an arginine-rich protein, and pressing the meat, while thus solidly frozen, to bind the same together in a predetermined form.

10. In a process for preparing a coherent ground-meat product, having improved interior color, the steps of comminuting meat while in unfrozen condition, freezing the comminuted meat to a solid state, breaking the frozen meat into loosely associated particles, adding sodium chloride to the surface of the meat particles, and pressing the meat, while thus solidly frozen, to bind the same together in a predetermined form.

11. In a process for preparing a coherent ground-meat product having improved interior color, the steps of freezing the meat mass, breaking the frozen meat into loosely associated particles, incorporating in the mass an edible protein-denaturing agent, introducing oxygen in minute amounts at points dispersed throughout the meat mass, and compressing the meat while thus solidly frozen and containing said introduced oxygen to bind the frozen particles together.

ERVIN W. HOPKINS.
LUCIAN J. JENDRYASZEK.
HAROLD M. COLEMAN.

REFERENCES CITED

The following references are of record in the file of this patent:

UNITED STATES PATENTS

| Number | Name | Date |
| --- | --- | --- |
| 1,909,508 | Shick | May 16, 1933 |
| 2,021,621 | Allen et al. | Nov. 19, 1935 |
| 2,060,422 | McKee et al. | Nov. 10, 1936 |
| 2,349,836 | Stuart | May 30, 1944 |

OTHER REFERENCES

"The Merck Index," 1940, Fifth edition, published by Merck & Co., Inc., Rahway, N. J., page 895, article by Sakaguchi, "Test for Blood, Protein," 3533.